United States Patent [19]
Wilson

[11] Patent Number: 5,887,848
[45] Date of Patent: Mar. 30, 1999

[54] FLUSH VALVE BYPASS AND FILTER

[75] Inventor: John R. Wilson, Naperville, Ill.

[73] Assignee: Sloan Valve Company, Franklin Park, Ill.

[21] Appl. No.: 932,656

[22] Filed: Sep. 18, 1997

[51] Int. Cl.⁶ ............................. F16K 7/17; F16K 31/385
[52] U.S. Cl. ............................. 251/40; 137/550; 138/40; 210/429; 210/431; 251/38; 251/45; 251/118; 251/120
[58] Field of Search .................................. 92/98 R, 102; 137/414, 544, 549, 550; 138/40, 41; 210/429, 431, 432; 251/38, 40, 45, 46, 118, 120, 121

[56] References Cited

U.S. PATENT DOCUMENTS

| | | | |
|---|---|---|---|
| 3,144,874 | 8/1964 | Goldtrap | 137/414 |
| 3,895,645 | 7/1975 | Johnson | 251/46 |
| 3,904,168 | 9/1975 | Marocco | 251/45 |
| 4,180,096 | 12/1979 | Johnson | 137/414 |
| 4,987,920 | 1/1991 | Donner | 251/46 |
| 5,332,192 | 7/1994 | Whiteside | 251/120 |
| 5,335,694 | 8/1994 | Whiteside | 251/40 |

Primary Examiner—George L. Walton
Attorney, Agent, or Firm—Dorn, McEachran, Jambor & Keating

[57] ABSTRACT

A diaphragm type of flush valve for use with toilet devices such as urinals and water closets includes a body with an inlet and an outlet and there is a valve seat therebetween and a valve member movable to a closing position on the valve seat. The valve member includes a diaphragm which is peripherally attached to the body. There is a pressure chamber above the diaphragm for holding the valve member on its valve seat and there is a filter and a bypass orifice connecting the inlet and the pressure chamber. The filter includes a filter ring positioned beneath the diaphragm and adjacent the outer periphery thereof. The filter ring and the diaphragm are held in a fixed position relative to each other. The filter ring has a plurality of outwardly directed circumferentially spaced filter grooves. There is a seal ring between the filter ring and the body and facing the grooves. A peripheral chamber is bounded by the seal ring, the filter ring and the body, with water reaching the peripheral chamber by passing through the filter ring grooves. There is an orifice connecting the peripheral chamber and the pressure chamber.

20 Claims, 3 Drawing Sheets

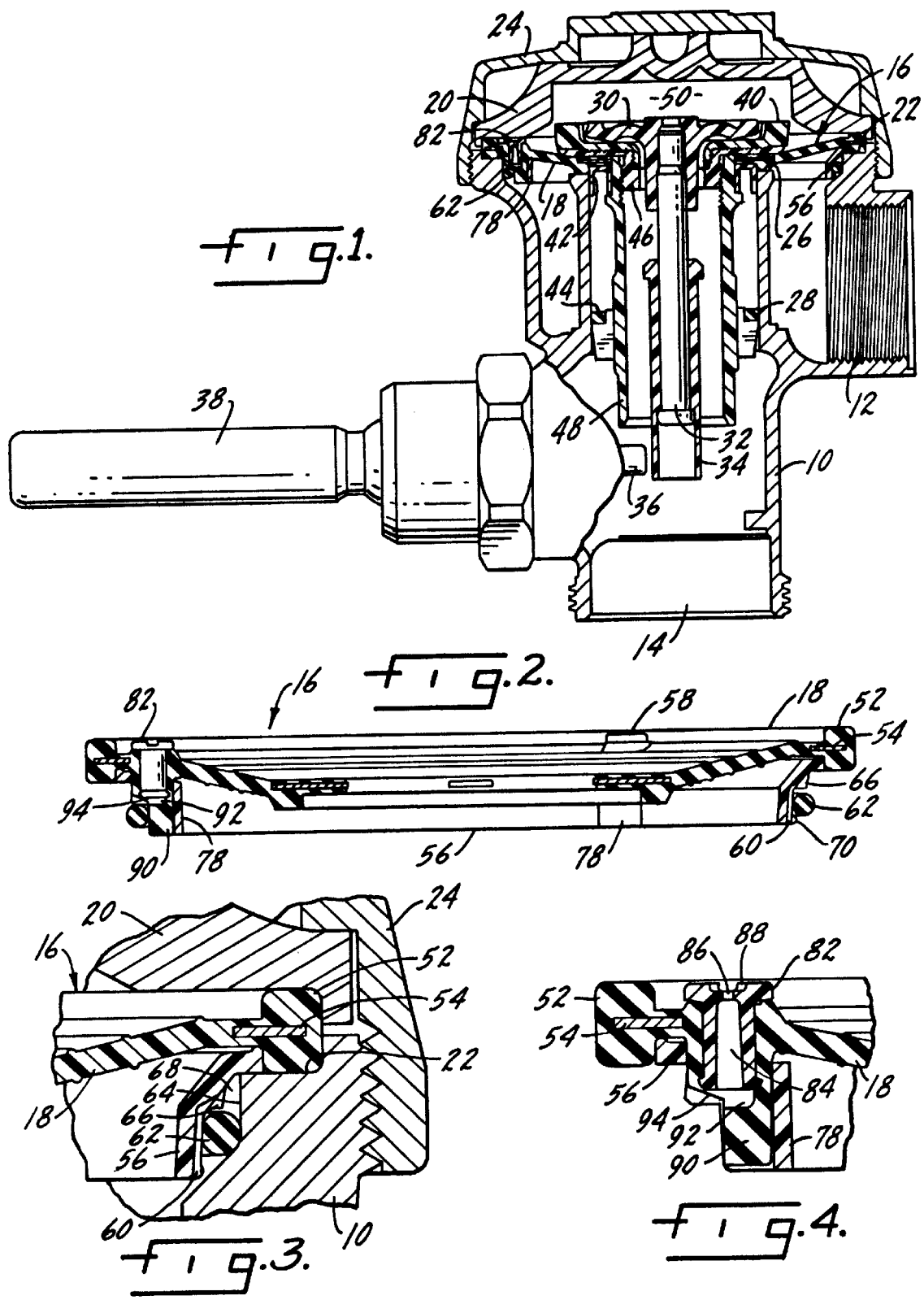

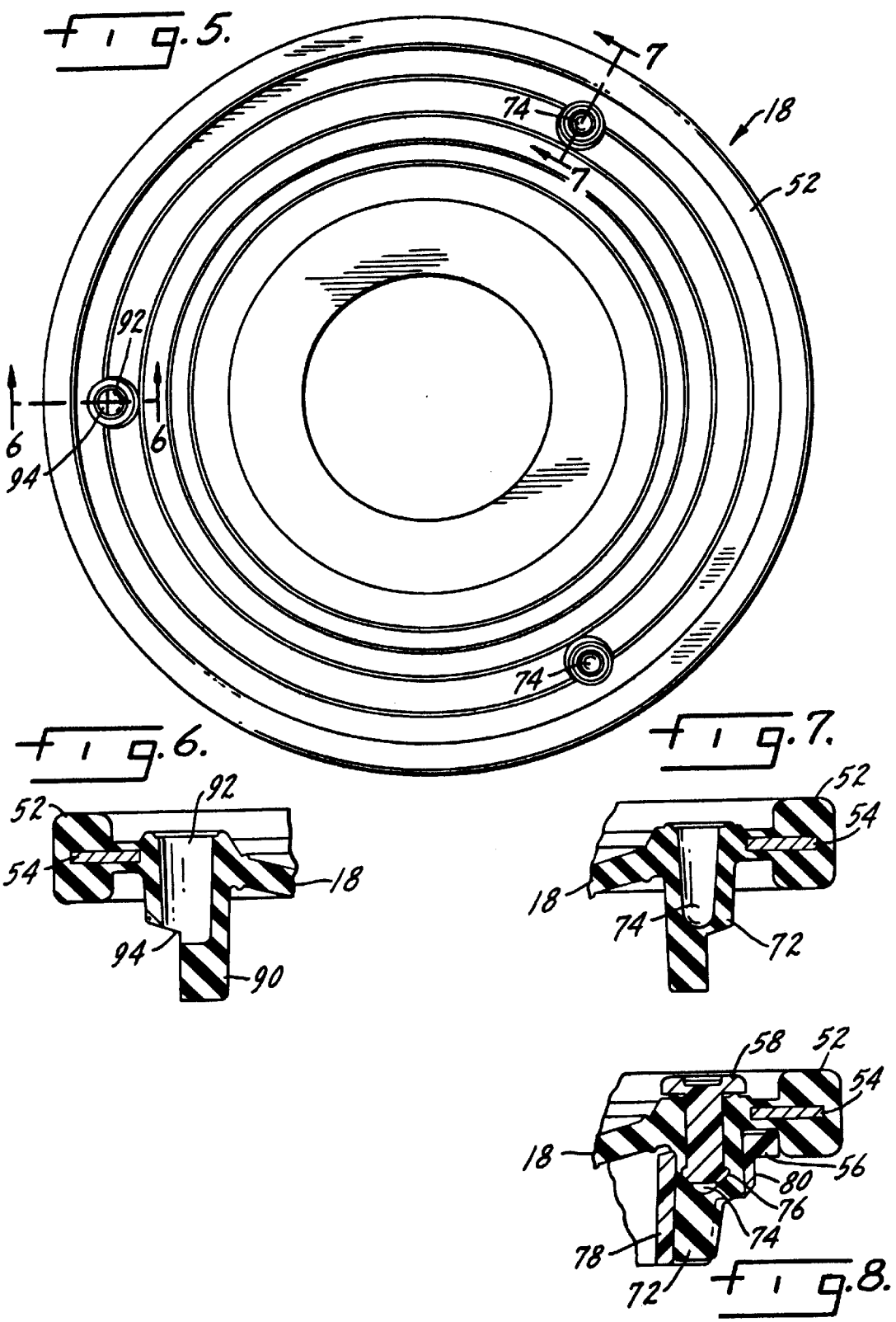

FLUSH VALVE BYPASS AND FILTER

FIELD OF THE INVENTION

Diaphragm type flush valves for use on toilet devices such as urinals and water closets have conventionally had a filter and a bypass orifice to connect the flush valve inlet with the pressure chamber above the diaphragm. The purpose of the filter and the bypass is to provide a water passageway of limited size to permit the pressure chamber to fill insuring closure of the flush valve by movement of the diaphragm onto its valve seat. There have been numerous prior art disclosures relating to the filter and the diaphragm. One such is shown in U.S. Pat. No. 5,332,192, assigned to the assignee of the present application, Sloan Valve Company of Franklin Park, Ill. The prior art listed therein also show many forms of diaphragm filters and bypass orifices.

The present invention is specifically directed to an improvement in the filter and bypass portion of the diaphragm and more specifically to an improved diaphragm assembly, which places the filter and the bypass orifice adjacent the diaphragm periphery. Such placement provides improved communication through the filter, thus insuring that the flush valve will close in a consistent manner to limit water flow through it to a predetermined volume as now mandated by many federal and state regulations.

The diaphragm filter and bypass orifice are located at the periphery of the diaphragm and are formed by a plastic ring which is located directly beneath the diaphragm periphery and held to the underside of the diaphragm. The plastic ring has a plurality of circumferentially arranged outwardly extending grooves and there is a seal ring positioned between these grooves and the flush valve body. There is a peripheral chamber above the seal ring and water passes through the grooves to reach the peripheral chamber. The orifice in the diaphragm connects the peripheral filter chamber and the pressure chamber above the diaphragm. The cooperation of these elements permits a reliable filter and bypass orifice assuring unclogged communication between the flush valve inlet and its pressure chamber and assuring water flow at a predetermined rate which will insure flush valve closure at the required time for consistent operation.

SUMMARY OF THE INVENTION

The present invention relates to flush valves for use on urinals and water closets and more specifically to an improved filter and bypass orifice for a flush valve.

A primary purpose of the invention is a diaphragm assembly for the use described in which the filter and bypass orifice are located adjacent the periphery of the diaphragm, rather than near the center or middle of the diaphragm as has been customary in prior art devices.

Another purpose of the invention is a diaphragm assembly as described in which the filter is formed by a plastic ring positioned on the underside of the diaphragm and having a plurality of generally uniformly spaced filter grooves formed therein.

Another purpose of the invention is a flush valve diaphragm as described in which the filter grooves cooperate with a seal ring positioned between the grooves and the flush valve body with the water reaching a peripheral filter chamber by passing through the grooves and between the filter ring and the seal ring.

Another purpose is a diaphragm assembly as described in which the filter ring and diaphragm are held together by a plurality of spaced filter retainers, one of which includes the orifice connecting the pressure chamber with the flush valve inlet.

Another purpose is a flush valve diaphragm assembly as described in which the filter and bypass orifice reliably provide a consistent and measured volume of water flow between a flush valve inlet and its outlet.

Other purposes will appear in the ensuing specification, drawings and claims.

BRIEF DESCRIPTION OF THE DRAWINGS

The invention is illustrated diagrammatically in the following drawings wherein:

FIG. 1 is a side view, in part section, illustrating a flush valve of the present invention;

FIG. 2 is an enlarged vertical section of the diaphragm and filter ring;

FIG. 3 is an enlarged vertical section showing the relationship between the diaphragm, filter ring, seal ring and flush valve body;

FIG. 4 is an enlarged section illustrating the bypass orifice;

FIG. 5 is an enlarged top view of the diaphragm;

FIG. 6 is a section along plane 6—6 of FIG. 5;

FIG. 7 is a section along plane 7—7 of FIG. 5;

FIG. 8 is a section illustrating one of the retainer members which holds the diaphragm and filter ring together;

DESCRIPTION OF THE PREFERRED EMBODIMENT

Figure 9:
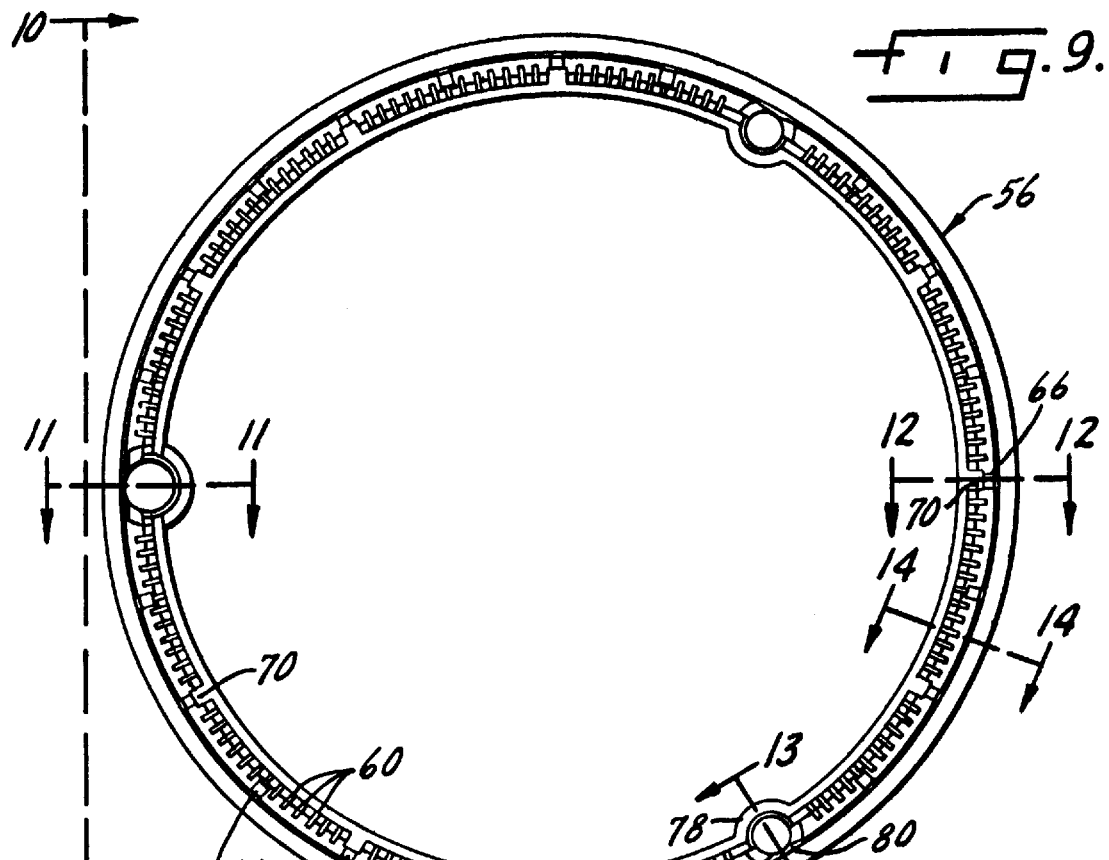
FIG. 9 is a bottom view of the filter ring.

The present invention describes a diaphragm assembly for a flush valve. The diaphragm assembly includes the conventional rubber or rubberlike member with a filter ring attached to the bottom adjacent the diaphragm periphery to provide filter passages. There is an orifice in the diaphragm which is in communication with a peripheral filter passage. The diaphragm assembly will be shown in connection with a flush valve of the type manufactured by the assignee of the present application, Sloan Valve Company of Franklin Park, Ill., and sold under the trademark ROYAL. The invention should not be so limited as it has equal application in other types of diaphragm flush valves.

The flush valve includes a body 10 having an inlet connection 12 and an outlet connection 14. A diaphragm assembly, indicated generally at 16, includes a diaphragm 18 peripherally held to the body 10 by an inner cover 20. The diaphragm is seated upon a shoulder 22 at the upper end of body 10 and is clamped in this position by the inner cover 20. An outer cover 24 is screw threaded onto the body to hold the inner cover in position.

The diaphragm assembly 16, as shown in FIG. 1, is closed upon a valve seat 26 formed at the upper end of a barrel 28. The barrel 28 forms the conduit connecting the valve seat with outlet 14. The diaphragm assembly 16 includes a relief valve 30 having a downwardly extending stem 32 carrying a movable sleeve 34. Sleeve 34 is positioned for contact by a plunger 36 when operated by a handle 38 as is conventional in the operation of flush valves of the type described.

The diaphragm assembly 16, in addition to diaphragm 18 and the relief valve 30 includes a retaining disk 40, a refill ring 42 and a flow control ring 44. The underside of the retaining disk 40 is threadedly attached to a collar 46 which in turn is threadedly attached at its exterior to a sleeve 48 which carries the refill ring 42. The above described assembly of elements firmly holds the diaphragm 18 between the upper face of the refill ring 42 and a lower facing surface of the collar 46.

Above the diaphragm assembly 16 is a pressure chamber 50 which maintains the diaphragm assembly in a closed position when the flush valve is not in use.

As is known in the art, when the handle 38 is operated, the plunger 36 will contact sleeve 34, lifting the relief valve 30 off of its seat on the retaining disk 40. This will permit the discharge of water within the pressure chamber 50 down through the sleeve 48. Inlet pressure will then cause the diaphragm to move upwardly off of its seat 26 permitting direct communication between the inlet 12 and the outlet 14 through the space between the bottom of the diaphragm assembly and the seat 26. As soon as this operation has taken place, the pressure chamber 50 will begin to fill through the to be described filter and bypass orifice in the diaphragm assembly. As flow continues into the pressure chamber 50, the diaphragm assembly will move toward its valve seat and when it has reached that position the flush valve will be in a closed position. It is important that the time period for which the flush valve is open be tightly controlled so that the volume of water which passes through the valve in a single flushing operation can be held to the close tolerances required by the various state and federal regulations in place at the present time.

Figure 10:
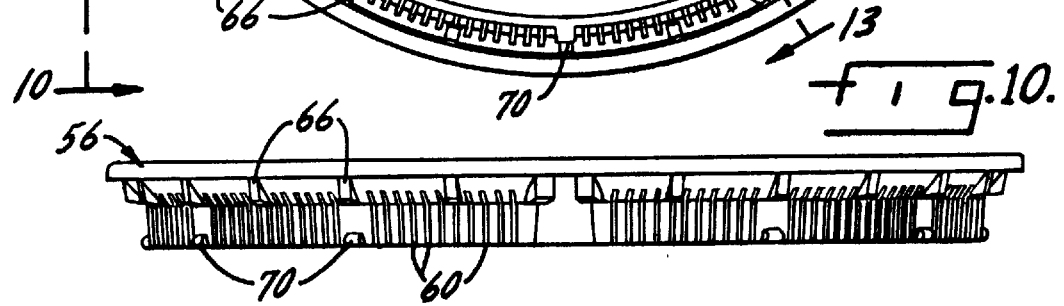
FIG. 10 is a side view along plane 10—10 of FIG. 9.
Figures 11, 12, 13:
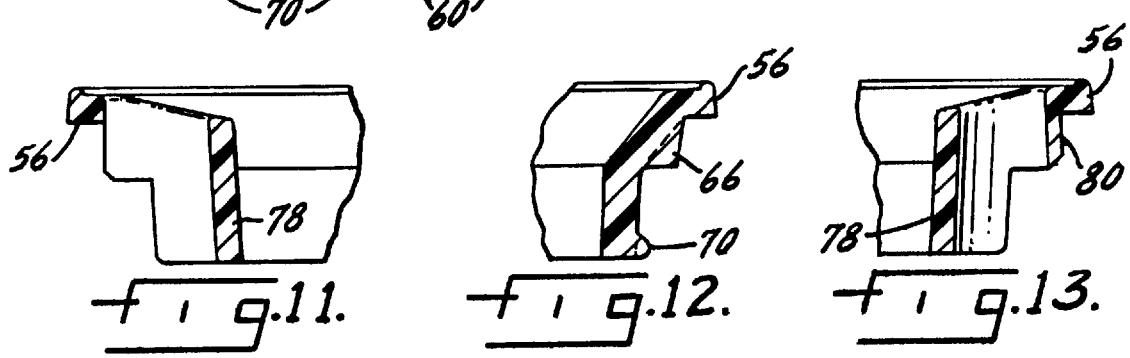
FIG. 11 is a section along plane 11—11 of FIG. 9.
FIG. 12 is a section along plane 12—12 of FIG. 9.
FIG. 13 is a section along plane 13—13 of FIG. 9.
Figure 14:
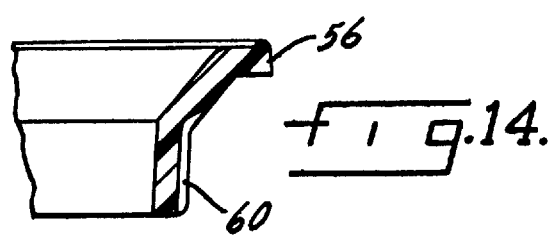
FIG. 14 is a section along plane 14—14 of FIG. 9.

The diaphragm assembly 16 includes the diaphragm 18 which has a peripheral rim 52 which will be held between the shoulder 22 of the body 10 and the inner cover 20. There may be a plurality of metal rings 54 embedded within the diaphragm as is customary in the art. A filter ring 56 illustrated in detail in FIGS. 9–14 is held to the underside of the diaphragm 18 by a plurality of retaining members or pegs, one of which is illustrated at 58 in FIG. 2.

The periphery of the filter ring 56 has a plurality of generally uniformly spaced outwardly facing grooves 60 which form the filter to prevent sediment and particles within the water from clogging the bypass orifice which would have the effect of preventing proper operation of the flush valve.

Focusing on FIG. 3, there is a seal ring 62 which is held between an inwardly facing surface 64 of the body 10 and the exterior of that portion of the ring 56 containing the grooves 60. The filter ring 56 includes a plurality of spaced upper seal supports 66 which are used to maintain the seal ring 62 in the position shown in FIG. 3 and to prevent it from moving upwardly into filter chamber 68. The normal passage of water will be through the filter grooves, inside of ring 62 into the peripheral filter chamber 68. The filter ring 56 may also have a plurality of lower seal ring supports 70, shown in FIG. 10, which assure that the seal ring 62 will be retained on the filter ring when the diaphragm assembly is handled during removal or installation.

As indicated above, a plurality of pegs 58 are used to attach the filter ring 56 to the diaphragm 18. Two of those pegs and the connection formed thereby are illustrated in FIGS. 7 and 8. Specifically, the diaphragm 18 has a projection 72 (FIG. 7) with a bore 74. A peg 58 fits within the bore 74 and an outwardly extending barb 76 adjacent the inner end of the peg has the effect of compressing the rubber or rubberlike material of the diaphragm between an inner wall portion 78 of the filter ring and an outer wall portion 80 of the filter ring. Thus the filter ring has a boss which is formed by the wall portions 78 and 80 shown in FIG. 8 with the diaphragm projection 72 fitting within the boss of the filter ring and then the peg 58 being inserted within the bore 74 with its barbed end expanding the rubber to thereby join the diaphragm and the filter ring.

FIGS. 4 and 6 illustrate a particular one of the pegs 58, designated at 82, which functions as the bypass orifice. The peg 82 has a passage 84 terminating at an orifice 86 with the orifice 86 opening into a recess 88 in the top of the peg 82. The recess may be circular or may be in the shape of a cross, but is there to ensure constant access and communication through the bypass orifice and into the pressure chamber 50.

The particular diaphragm projection 90 (FIG. 6) which holds the peg 82 having the bypass orifice is similar to the projection 72 shown in FIG. 7 except that the bore 92 of the projection 90 is in communication with the peripheral filter chamber 68. Thus water within the chamber 68 will have access to the bore 92 through an opening 94 such that filtered water will reach the bore 84 in the peg 82 and then will flow to the bypass orifice 86.

Of particular advantage in the invention is the fact that the filter is at the outer periphery of the flush valve thus providing a greater number of filter grooves and thus a longer period for filter life before the passage of water to the pressure chamber through the orifice will be impeded. Each of the filter grooves 60 will be smaller than the bypass orifice so that no particle which would pass through a groove can clog the bypass orifice. The pegs or retainer members which hold the filter ring and the diaphragm together also function, in the case of one of the pegs, to form the bypass orifice. The diaphragm assembly is simple in construction and reliably operable.

Whereas the preferred form of the invention has been shown and described herein, it should be realized that there may be many modifications, substitutions and alterations thereto.

I claim:

1. A diaphragm type of flush valve for use with toilet devices such as urinals and water closets including a body having an inlet and an outlet, a valve seat between said inlet and outlet and a valve member movable to a closing position on said valve seat to control water flow between said inlet and outlet, said valve member including a diaphragm peripherally attached to said body, a pressure chamber above said diaphragm with water therein holding said valve member on said valve seat, and a filter and bypass orifice connecting said inlet with said pressure chamber, to provide water therefor to move said diaphragm to said closing position, said filter including a filter ring positioned beneath said diaphragm adjacent the outer periphery thereof, means holding said filter ring and diaphragm in fixed position relative to each other, said filter ring having a plurality of outwardly directed circumferentially spaced filter grooves, a seal ring retained between said ring and said body and facing said grooves, a peripheral chamber bounded by said seal ring, filter ring and body, with water reaching said peripheral chamber by passing through said grooves, and an orifice in said diaphragm connecting said peripheral chamber and said pressure chamber.

2. The flush valve of claim 1 further including a seal ring support located above said seal ring and extending outwardly from said filter ring.

3. The flush valve of claim 2 wherein said seal ring support above said seal ring includes a plurality of projections integral with and extending outwardly from said filter ring.

4. The flush valve of claim 2 further including a plurality of lower seal ring supports positioned beneath said seal ring and extending outwardly from said filter ring.

5. The flush valve of claim 1 including a cover forming the upper portion of said pressure chamber, with said diaphragm being held between the periphery of said cover and a peripheral portion of said flush valve body.

6. The flush valve of claim 1 wherein the means holding said filter ring and diaphragm in fixed position relative to each other includes a plurality of retaining members extending downwardly from the top of said diaphragm.

7. The flush valve of claim 6 wherein the lower end of at least one of said retaining members has an outward extension to compress the diaphragm between portions of said filter ring.

8. The flush valve of claim 7 wherein said diaphragm had a plurality of projections, with at least one of said projections receiving one of said retaining members with said outward extension.

9. The flush valve of claim 6 wherein said orifice is located in one of said retaining members.

10. The flush valve of claim 9 wherein the orifice in one of said retaining members includes an axial passage.

11. The flush valve of claim 8 wherein each of said diaphragm projections includes a retaining member with an outward extension.

12. The flush valve of claim 11 wherein one of said diaphragm projections includes a bore in communication with said filter chamber, said orifice being located in the retaining member in said bore.

13. A valve member assembly for use in a toilet device flush valve having a valve body and an inlet and an outlet therefor, said flush valve having a seat to close communication between said inlet and outlet and said valve member assembly being formed and adapted to close upon said seat, said valve member assembly including a diaphragm, a filter and bypass orifice formed in the valve member assembly for use in connecting the flush valve inlet and a flush valve pressure chamber above the valve member assembly to cause movement thereof to a valve closing position, said filter including a filter ring positioned beneath said diaphragm adjacent the outer periphery thereof, retaining means holding said filter ring and diaphragm in fixed position relative to each other, said filter ring having a plurality of outwardly-directed circumferentially spaced filter grooves, a seal ring extending about said filter ring and facing said grooves, a peripheral chamber bounded by said seal ring and filter ring, with water from the flush valve inlet reaching said peripheral and said pressure chamber.

14. The flush valve of claim 13 further including a seal ring support located above said seal ring and extending outwardly from said filter ring.

15. The flush valve of claim 14 wherein said seal ring support above said seal ring includes a plurality of projections integral with and extending outwardly from said filter ring.

16. The flush valve of claim 14 further including a plurality of lower seal ring supports positioned beneath said seal ring and extending outwardly from said filter ring.

17. The flush valve of claim 1 wherein the retaining means holding said filter ring and diaphragm in fixed position relative to each other includes a plurality of retaining members extending downwardly from the top of said diaphragm.

18. The flush valve of claim 17 wherein the lower end of at least one of said retaining members has an outward extension to compress the diaphragm between portions of said filter ring.

19. The flush valve of claim 18 wherein said diaphragm had a plurality of projections, with each of said projections receiving a retaining member with an outward extension.

20. The flush valve of claim 19 wherein said orifice is located in one of said retaining members.

* * * * *